United States Patent [19]

Robles

[11] 3,760,620

[45] Sept. 25, 1973

[54] WHEEL LOCKING DEVICE

[76] Inventor: Henry Robles, 509 Stanford Ave., Redwood City, Calif. 94063

[22] Filed: Sept. 23, 1971

[21] Appl. No.: 183,126

[52] U.S. Cl. .................... 70/226, 70/14, 192/6 R, 292/148
[51] Int. Cl. ........................................... E05b 71/00
[58] Field of Search ...................... 70/14, 226, 227, 70/233, 236; 85/9, 28, 53; 211/5; 292/148

[56] References Cited
UNITED STATES PATENTS

| | | | |
|---|---|---|---|
| 2,358,914 | 9/1944 | Dray | 292/148 |
| 2,473,177 | 6/1949 | Sherwood | 192/6 R |
| 548,333 | 10/1895 | Ward | 287/108 |
| 2,659,952 | 11/1953 | Schlueter | 24/221 K |

FOREIGN PATENTS OR APPLICATIONS

| | | | |
|---|---|---|---|
| 12,993 | 1895 | Great Britain | 70/227 |
| 15,143 | 0/1906 | Great Britain | 70/227 |
| 490,687 | 2/1954 | Italy | 70/226 |

*Primary Examiner*—Albert G. Craig, Jr.
*Attorney*—Stephen S. Townsend et al.

[57] ABSTRACT

A solid bolt lock for securing the rear wheel of a motorcycle against rotation while the vehicle is left unattended. The lock has an elongate cylindrical shank of case-hardened steel provided with a number of radially projecting dowels at one end. A bore extends transversely through the bolt shank at a spaced axial distance from the dowels. In operation, the bolt is inserted through the unoccupied portion of the chain-tension adjustment slot in one of the rear frame braces and thereafter through an aligned eccentrically positioned aperture in the adjacent wheel hub flange. A conventional padlock is inserted through the bore capturing the frame between itself and the dowels thereby preventing removal of the lock.

7 Claims, 5 Drawing Figures

PATENTED SEP 25 1973 3,760,620
FIG_1
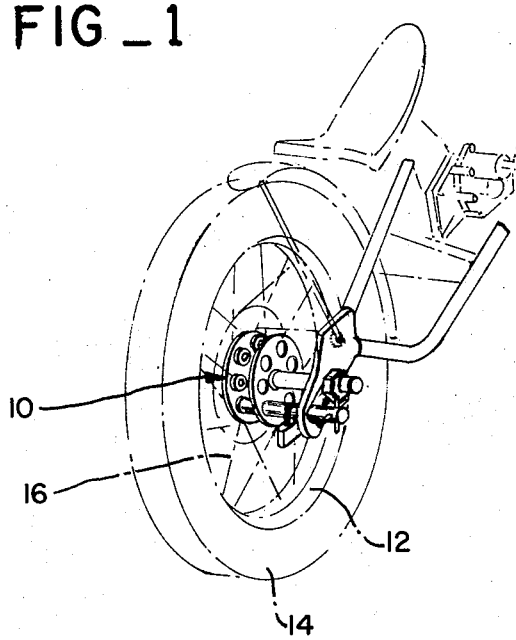
FIG_2
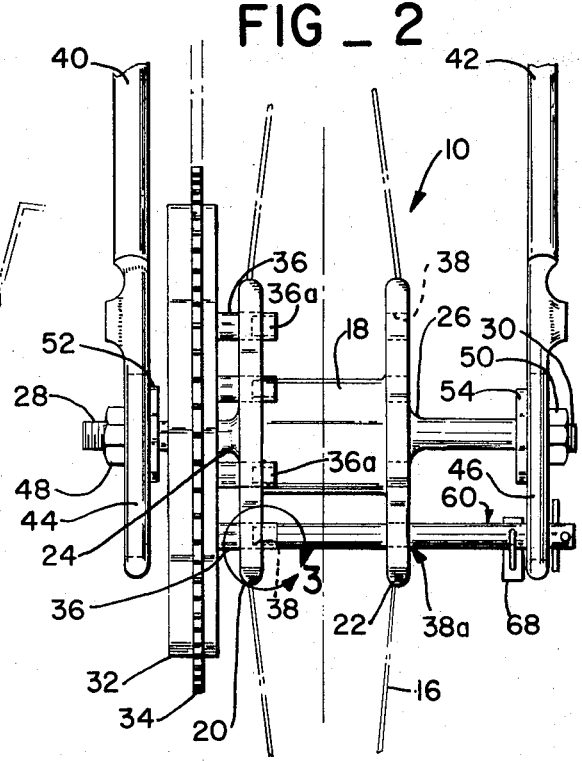
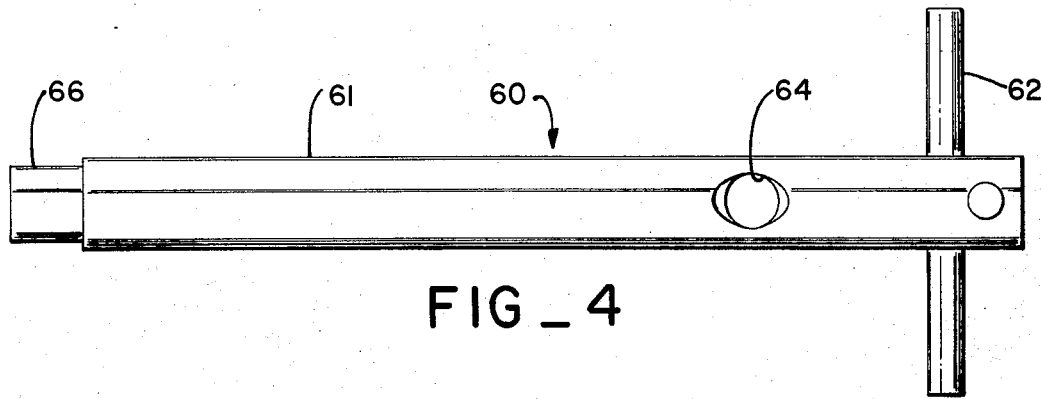
FIG_4
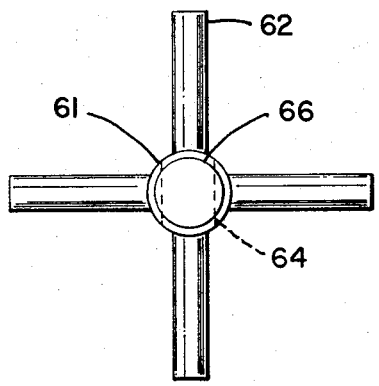
FIG_5
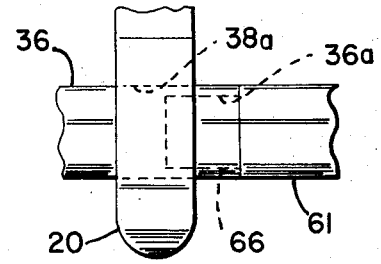
FIG_3

WHEEL LOCKING DEVICE

The present invention relates to vehicle wheel locking devices and is more particularly directed to a solid bolt lock for securing the rear wheel of a motorcycle against rotation.

The most commonly used method of locking the rear wheel of a motorcycle while the vehicle is left unattended is insertion of a heavy link chain formed of hardened steel between the wheel spokes and fastening of the chain ends with a padlock. Such a chian is generally quite heavy and occupies a considerable amount of space when not in use. Since it is obviously desirable to carry any locking device with the motorcycle at all times, the weight and bulk of the chain reduces the overall utility of the vehicle. In addition, placement and removal of the chain are often time consuming operations.

While various bolt locks which engage parts of the wheel sprocket or spokes are known, particularly in relation to bicycles, devices of this nature typically incorporate a complicated internal mechanism with numerous moving parts including tumblers, springs, etc. These bolt locks are usually formed as an integral part of the vehicle and are thus not readily transferable from one vehicle to another.

The present invention, on the other hand, comprises a solid cylindrical bolt lock which has no internal moving parts, is easily removed from the vehicle, is lightweight and occupies little space when not in use. Its basic simplicity of design and lack of critical dimensional tolerances allows large scale manufacture with significant cost reduction over existing devices which perform a similar function. The lock is adapted for either key or combination release and is interchangeable on a large number of basically similar vehicles. In addition, because it is solid the lock is highly resistant to forced removal such as with a hacksaw or other cutting tool and it may be readily heat treated to further increase its hardness.

Other objects, features and advantages of the present invention will be more readily apparent after reading the following detailed description with reference to the accomapnying drawings.

FIG. 1 is a perspective view of the rear portion of a motorcycle showing the locking device of the present invention in place;

FIG. 2 is a plan view of the rear wheel spool assembly of the motorcycle of FIG. 1 mounted between two rear frame forks to illustrate engagement of the lock of the present invention with the various parts thereof;

FIG. 3 is an enlarged detail of insert A of FIG. 2;

FIG. 4 is a side view of the bolt lock of the present invention; and

FIG. 5 is an end view of the bolt lock of FIG. 4.

Referring now to the drawings, in reference to FIGS. 1 and 2, one embodiment of the bolt lock of the present invention will be described in conjunction with a rear wheel assembly of the type found on a Harley Davidson Model 74 motorcycle. Although the invention is especially well adapted to this vehicle, it will be appreciated that reference thereto is for purposes of illustration only and the utility and scope of the present invention is not restricted to this particular vehicle.

Rear wheel rim 12 carries tire 14 and is mounted to rear wheel spool assembly 10 by radially extending spokes 16. Spool assembly 10 includes a central cylindrical hub 18 mounted between a pair of circular flanges sections 20 and 22 which extend radially outward beyond the hub periphery. The radially interior ends of spokes 16 are attached to the outer periphery of flange sections 20 and 22 and the exterior ends of spokes 16 are attached to rim 12.

Axles 24 and 26 are mounted to the outboard sides of flange sections 20 and 22, respectively, and extend axially outwardly from the centers thereof. The exterior ends of axles 24 and 26 are rotatably mounted within axle housings 28 and 30, respectively, by means of ball bearings (not shown) and the exterior ends of axle housings 28 and 30 are threaded. Drive chain sprocket 32 is mounted to axle 24 adjacent to the outboard side of flange section 20 for powered rotation thereof from the motorcycle engine through drive chain 34.

The internal surface of sprocket 32 forms the drum of the rear wheel brake assembly and thus sprocket 32 transmits both acceleration and deceleration forces to the rotatable rear wheel elements including flanges 20 and 22 which in turn deliver the rotational power to tire 14 through spokes 16. Sprocket 32 is provided with a plurality of cylindrical projections 36 which extend inwardly toward the outboard side of adjacent flange 20. Projections 36 are arranged in a circular pattern about the center of rotation of sprocket 32 and engage a like number of apertures 38 in flange 20 arranged in an aligned circular pattern. The purpose of this interengagement between the projections on sprocket 32 and the apertures in flange 20 is to efficiently transmit to the spool assembly the torque delivered from the engine through chain 34. Projections 36 are each provided at their ends with a cylindrical recess 36a having a diameter smaller than that of apertures 38.

Spool assembly 10 is mounted to the motorcycle frame by engagement with spaced rear frame forks 40 and 42 extending rearwardly on either side of the spool assembly. Rear forks 40 and 42 are each provided with an elongate slot 44 and 46 through which the exterior ends of axle housings 28 and 30, respectively, protrude. Lock nuts 48 and 50 engage the threads on the exterior ends of housings 28 and 30 and force the frame elements inwardly against circular projections 52 and 54 on axle housings 28 and 30, respectively. When lock nuts 48 and 50 are suitably loosened, axle housings 28 and 30 are movable within elongate slots 44 and 46. This movement permits positioning of the spool assembly including sprocket 32 fore and aft with respect to the frame and allows the tension in drive chain 34 to be properly adjusted. Regardless of the position of housings 28 and 30 within slots 44 and 46, the overall length of the slot is such that there remains an unoccupied passageway through the frame sufficient for introduction of the bolt lock of the present invention as most clearly shown in FIG. 1.

Referring now to FIGS. 3, 4 & 5, the bolt lock of the present invention generally shown at 60 comprises an elongate cylindrical shank 61 having a number of radially extending dowels 62 projecting transversely from one end. The bolt is provided with a transverse bore 64 extending through shank 61 at a distance from dowels 62 equal to at least the thickness of frame element 42. Stepped-down cylindrical extension 66 is provided at the end of shank 61 opposite dowels 62. Placement of the bolt lock in a locking position proceeds as follows. End 66 is inserted through the unoccupied portion of elongate slot 46 from the exterior side of frame brace 42. The bolt is then passed through an aligned aperture 38a in flange section 22. If none of the apertures 24 in flange section 22 are angularly aligned with the end of the bolt at this time, the wheel may be rotated slightly to bring one of the apertures into such alignment. The bolt is then advanced toward sprocket 32 until projection 66 seats within conforming cylindrical recess 36a in an aligned projection 36. A padlock of conventional design 68 is then inserted through bore 64 capturing frame element 42 between padlock 68 and dowels 62. This arrangement effectively prevents withdrawal of the bolt once the padlock is in place. To remove the lock, it is only necessary to remove padlock 68 and slidably withdraw the body of bolt 60.

While one embodiment of the bolt lock of the present invention has been shown and described, it will be apparent that numerous adaptations and modifications can be made without departing from the scope of the invention. For example, in the case of motorcycles not having an apertured hub flange, a single hole radially aligned with the axis of insertion of the bolt shank through the chain tension adjustment slot may be formed in the flange to receive the bolt.

What is claimed is:

1. A wheel locking device for a motorcycle of the type having a rear wheel spool assembly including a central cylindrical hub, two circular flanges on either side of said hub extending radially outwardly from the hub periphery and having a plurality of apertures extending therethrough arranged in a circular pattern about the flange center, two axles extending axially outwardly from the centers of said flanges, two axle housings, each having the exterior end of one of said axles rotatably mounted therein, and a drive chain sprocket mounted to one of said axles adjacent the outboard side of the flange associated therewith and having a plurality of axially inwardly extending projections arranged in a circular pattern in alignment with the circular pattern of said flange apertures for engagement therewith, said spool assembly being mounted to the frame of said motorcycle by protrusion of the exterior ends of said axle housings through an elongate slot in each of a spaced pair of rear frame members extending on opposite sides of said spool assembly to permit movement thereof fore and aft with respect to said frame in order to vary the tension in said drive chain, said locking device comprising: a cylindrical bolt adapted to pass through an unoccupied portion of said elongate slot on the frame member opposite said sprocket and thereafter through an aligned one of said apertures in the adjacent one of said flanges, said bolt including stop means at one end thereof extending radially outwardly from said bolt beyond said slot and a bore extending transversely through said bolt at a spaced distance from said stop means equal to at least the thickness of said frame element, said bore being adapted to receive a padlock whereby saud frame element is captured between said padlock and stop means and said bolt prevents rotation of said flange, the end of said bolt opposite said stop means being provided with a projection having a circular cross section of smaller area than said bolt cross section to engage a mating recess in an aligned one of said sprocket projections upon full insertion of said bolt.

2. Apparatus according to claim 1 wherein the interior end of each of said sprocket projections is provided with a circular recess to selectively receive said bolt projection.

3. Apparatus according to claim 1 wherein said stop means comprises a plurality of radially extending dowels projecting from said bolt.

4. Apparatus according to claim 1 wherein said bolt is heat-treated case hardened steel.

5. In a motorcycle of the type having a rear wheel spool assembly mounted for rotation between a spaced pair of frame rear fork members and wherein one of said fork members and said spool assembly have aligned apertures, a solid cylindrical bolt lock adapted to pass through both of said aligned apertures, said bolt including stop means at one end thereof extending radially outwardly from said bolt beyond said slot and a bore extending transversely through said bolt at a spaced distance from said stop means equal to at least the thickness of said frame element, said bore being adapted to receive a padlock whereby said frame element is captured between said padlock and stop means and said bolt prevents rotation of said spool assembly, said bolt further including a stepped-down projection at the end thereof opposite said stop means for mating engagement with an aligned recess in said spool assembly upon full insertion of said bolt.

6. A motorcycle wheel locking device comprising a cylindrical bolt having a shank portion adapted to pass through aligned apertures in the motorcycle rear fork frame element and rear wheel hub assembly and a head portion at one end thereof extending radially outward from said shank portion beyond said frame aperture, said bolt having a transverse bore extending through said shank at a spaced interval from said head portion to receive a padlock after insertion of said bolt through said frame aperture whereby said frame is captured between said head portion and said padlock, said bolt further having a stepped-down projection at the end thereof opposite said head portion for mating engagement with an aligned recess in said wheel hub assembly upon full insertion of said bolt.

7. Apparatus according to claim 6 wherein said shank portion is cylindrical and said head portion comprises a plurality of transverse dowels having an axis extending radially outward from the axis of said shank portion.

* * * * *